United States Patent [19]

Miyakawa

[11] Patent Number: 4,687,974

[45] Date of Patent: Aug. 18, 1987

[54] METHOD FOR SCANNING FIBER OPTIC TUBE

[75] Inventor: Tadashi Miyakawa, Kaisei, Japan

[73] Assignee: Fuji Photo Film Co., Ltd., Kanagawa, Japan

[21] Appl. No.: 671,763

[22] Filed: Nov. 14, 1984

[30] Foreign Application Priority Data

Nov. 17, 1983 [JP] Japan ................................ 58-216685
Nov. 21, 1983 [JP] Japan ................................ 58-219294

[51] Int. Cl.⁴ ........................ H01J 29/80; H04N 9/22
[52] U.S. Cl. ...................................... 315/375; 358/66; 358/901
[58] Field of Search ............... 315/364, 395, 367, 366, 315/375; 358/75, 78, 66, 901, 293, 200

[56] References Cited

U.S. PATENT DOCUMENTS

| | | | |
|---|---|---|---|
| 3,860,753 | 1/1975 | Tsuneta et al. | 358/286 |
| 4,141,642 | 2/1979 | Nagai et al. | 358/250 |
| 4,305,092 | 12/1981 | Katzfey | 358/60 |
| 4,309,720 | 1/1982 | Denham | 358/75 |

Primary Examiner—Theodore M. Blum
Assistant Examiner—David Cain
Attorney, Agent, or Firm—Wenderoth, Lind & Ponack

[57] ABSTRACT

In a method for scanning a color fiber optic tube of an electron gun type in which a screen is formed by a plurality of band-shaped phosphors providing different illuminant colors, usually red, green and blue, respectively, an electron beam from the electron gun is deflected vertically in a lateral direction of the phosphors and horizontally in a longitudinal direction thereof. The vertical deflection of the electron beam is time controlled in response to the sensitivity of a photo-sensitive material disposed to the fiber optic tube. In another aspect, the horizontal deflection is performed by a stepped method in which the horizontal deflection is stopped during a time interval when one raster of the vertical deflection of the electron beam crosses the phosphors and progresses stepwisely when the vertical deflection is subsequently transferred to the next raster.

5 Claims, 13 Drawing Figures

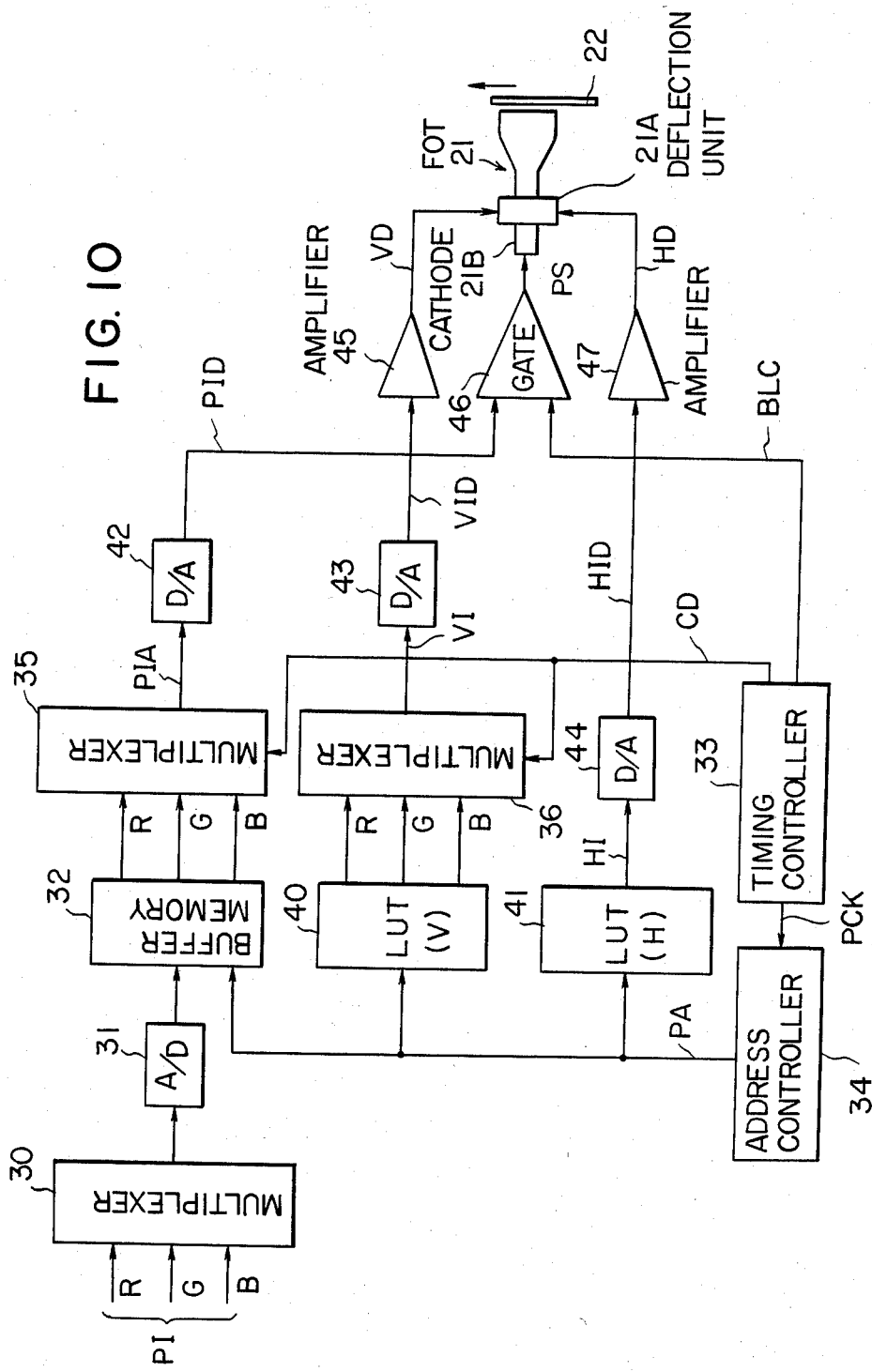

METHOD FOR SCANNING FIBER OPTIC TUBE

BACKGROUND OF THE INVENTION

This invention relates to a method for scanning a color fiber optic tube.

FIGS. 1 and 2 show one example of a color fiber optic tube (called FOT hereinafter) 1, which is provided with a substantially rectangular fiber optic plate (called FOP hereinafter) 2 at the front end of th FOT 1. A singal electron gun 3 is connected to the rear end of the FOT 1 for generating electron beam 4 and a plurality of fluorescent screens 5 each comprising an illuminant color material are laminated on the inner suface, facing the electron gun 3, of the FOP 2. On the fluorescent screens 5, for example as shown in FIGS. 2A and 2B, are applied in a band-like form phosphors 5R, 5G and 5B provided with fluorescent characteristics of red color (R), green color (G) and blue color (B), respectively. Information regarding the respective colors of the phosphors 5R, 5G and 5B is sensed through the FOP 2 on a color photo-sensitive material 6 for recording the same which colsely adheres to the FOP 2 and moves upward, for example.

A driving method for the FOT 1 mentioned above, will be described hereunder in connection with a color picture signal PS for a raster scanning type display. Electron beam 4 from the electron gun 3 is scanned so as to synchronize the red, green and blue phosphors 5R, 5G and 5B formed on the rear surface of the FOP 2 with deflection signals of input picture signals, and when the beam 4 passes the fluorescent screens 5, picture signals SR, SG and SB corresponding respectively to the phosphors 5R, 5G and 5B are selected and luminance modulation is carrier out with a selected picture signal PS. In detail, with reference to FIG. 3, during the time interval t0–t1 when the electron beam 4 scans the red hosphor 5R, the picture signal SR representing the red color component is selected and modulated into an electric current of the electron beam thereby to illuminate the red phosphor 5R thereby to make sensitive the color sensitive material 6. In the like manner, during the time intervals t1–t2 and t2–t3 when the electron beam 4 scans the green and blue phosphors 5G and 5B, the picture signals SG and SB respectively representing the green and blue color components are selected and modulated. Accordingly, the picture signals SR, SG and SB are recorded in time series on the photo-sensitive material 6, the picture signal PS represents the picture signal SR, SG or SB which is selectively composed in synchronism with the scanning position of the electron beam 4 and the luminance modulation in the FOT 1 can be realized by the picture signal PS.

The principle for carrying out color recording operation in use of the FOT 1 of the type mentioned above will be described hereunder in conjuction with FIGS. 4 through 6.

FIG. 4 shows a still color picture 10A displayed on a color cathode ray tube (CRT) of a raster scanning type, and a rectangular part 10B of the color picture 10A is subjected to the sampling operation in accordance with the raster scanning method and displayed on the FOP 2 of the FOT 1 as shown in FIG. 5. The picture displayed on the FOP 2 is color separated, in band-shape, into three colors of red, green and blue, and the luminance thereof is modulated with picture signals SR, SG and SB of the separated colors corresponding to the phosphors 5R, 5G and 5B, respectively. The still color picture 10A is sequentially displayed by a portion of the part 10B thereof while shifting the necessary picture elements to a predetermined direction 11 on the red, green and blue phosphors 5R, 5G and 5B formed in a band-shape on the FOP 2 as shown in an electric light display board. In this manner, the picture which is displayed on the FOP 2 of the FOT 1 and moves thereon is sensed on the color photo-sensitive material 6 which adheres closely to the front surface of the FOP 2 and moves at the same speed as that of the displayed picture in the predetermined direction 11. Accordingly, in the case where the electron beam 4 crosses the red phosphor 5R to carry out the luminance modulation, information regarding only the red color in the input pictures signal is recorded as a latent image in the color photo-sensitive material 6. In the same manner, informations regarding the green and blue colors are color-separated and exposed in a band shape to the color photo-sensitive material 6. Thus, one sheet of the completed color latent image picture is exposed to the color sensitive material 6 by moving the sensitive material in synchronism with the display picture and recording them in an overlapping manner.

However, the color photo-sensitive material 6 of the type descrobed above has sensitivity characteristics having difference based on the respective colors R, G and B and based on the output picture element positions. Moreover, a high quality picture output cannot be obtained by the method that the beams are irradiated at the illuminating positions of the respective phosphors under the same conditions.

Furthermore, in the scanning method of the FOP 1 of the type described abive, since the picture signal is separated with respect to the respective color picture elements to illuminate the phosphors, data regarding colors R, G and B, of one picture element are decomposed in the horizontal direction and outputted when the horizontal deviation is continuously carried out, thus making a problem regarding unevenness of the picture. In addition, each phosphor has a flat plate constructure, so that when the electron beam is subjected to the horizontal deviation at a constant speed with respect to the position of the phosphor, the deviation speed is undesirably increased at both ends of the phosphor, thus degrading the quality of the picture.

SUMMARY OF THE INVENTION

An object of this invention is to obviate the above-mentioned problems and disadvantages encountered in conventional scanning methods of a color FOT and to provide an improved method for scanning the FOT in which scanning electron beam is deflected in vertical and horizontal directions in a controlled manner.

Another object of this invention is to provide a scanning method of the FOT in which the vertical deflection of the electron beam can be time controlled in response to the sensitivities of phosphors and color photo-sensitive material.

A further object of this invention is to provide a scanning method for the color fiber optic tube in which the deflection speed in the horizontal direction of the electron beam can be varied in accordance with the position of each phosphor.

According to this invention, there is provided a method for scanning a color fiber optic tube of an electron gun type in which a screen is formed by a plurality of band-shaped phosphors providing different illuminant colors, respectively, and the method comprises steps of vertically deflecting an electron beam from the electron gun in a lateral direction of a plurality of phosphors and horizontally deflecting the electron beam in a longitudinal direction of the phosphors.

In one aspect of this invention, the scanning method is characterized in that the verical deflection of the elelctron beam from the electron gun is time controlled in response to the sensitivity of a photo-sensitive material disposed to the fiber optic tube for recording a picture and the respective phosphors.

In another aspect of this invention, the scanning method is characterized in that horizontal deflection of the electron beam from the electron gun is performed by a stepped manner in which the horizontal deflection is stopped during a time interval when one raster of the vertical deflection of the electron beam crosses the phosphors and the horizontal deflection progresses stepwisely when the vertical deflection is transferred to a subsequent next raster. According to the scanning method of this invention, since the illuminating time with respect to the respective color phosphors is controlled in response to the sensitivity of the photo-sensitive material to be used for recording and the characteristic features of the phosphors on the fiber optic plate, a picture with high quality can always be obtained throughout the whole surfaces of the fiber optic plate. In addition, since the horizontal deflection of the electron beam with respect to the fiber optic tube is performed stepwisely and the vertical deflection is performed when the horizontal deflection is not performed, the picture element data separated into respective picture colors R, G and B are securely recorded. Moreover, since the horizontal deflection speed is made relatively slow at both ends of the fiber optic plate and relatively fast at the central portion thereof, a picture with high quality can be obtained throughout the whole surface of the fiber optic plate.

The nature, principle and utility of the invention will become more apparent from the following detailed description when read in conjunction with the accompanying drawings.

BRIEF DESCRIPTION OF THE DRAWINGS

In the accompanying drawings:

FIGS. 9 and 10 are schematic diagrams showing apparatus for carrying out the scanning method according to this invention.

DESCRIPTION OF THE PREFERRED EMBODIMENTS

Figure 1:
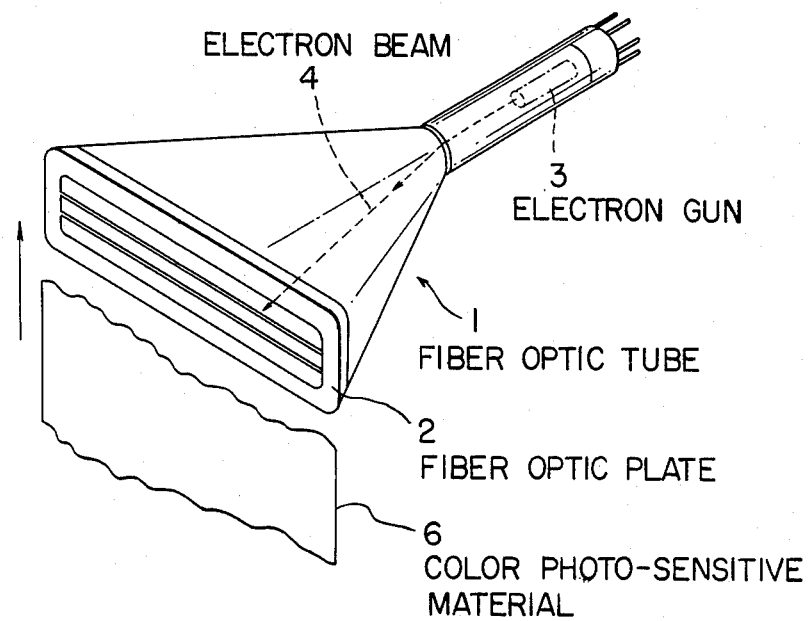
FIG. 1 is a perspective view showing a fiber optic tube to be used to carry out the method of this invention.
Figure 2A:
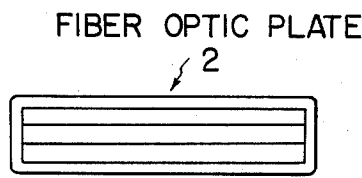
FIGS. 2A and 2B are front and side views showing a fiber optic plate attached to the fiber optic tube shown in FIG. 1.
Figure 2B:
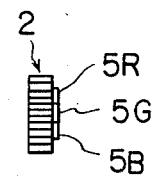
Figure 3:
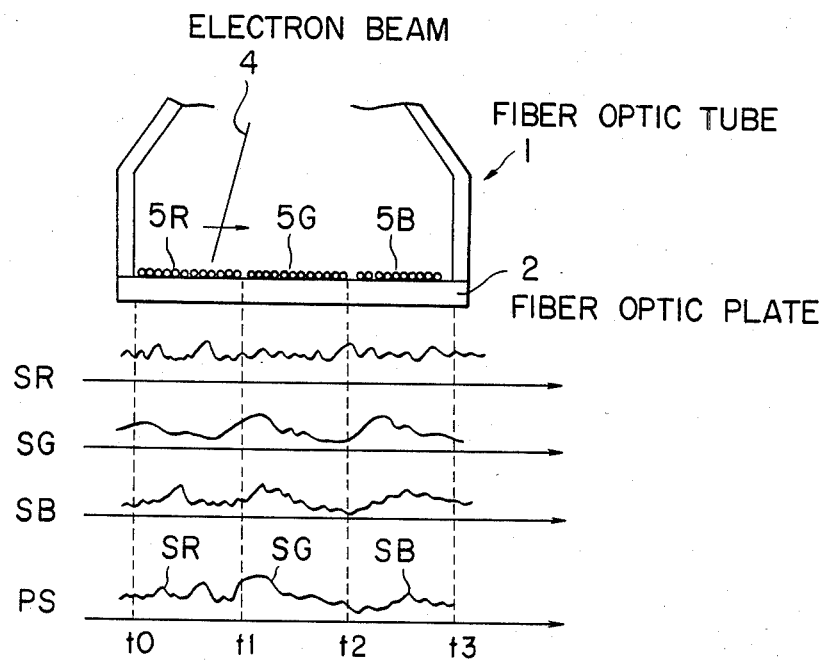
FIG. 3 is a view for showing an operation example of the fiber optic tube shown in FIG. 1.
Figure 4:
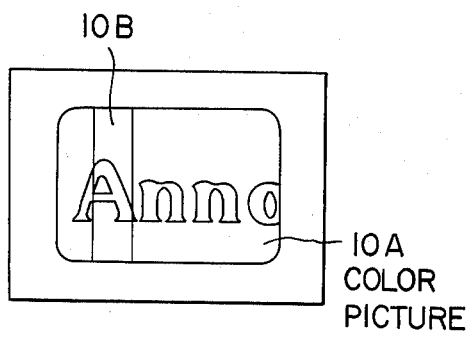
FIGS. 4 through 6 are schematic views for explaining scanning condition of the method according to this invention.
Figure 5:
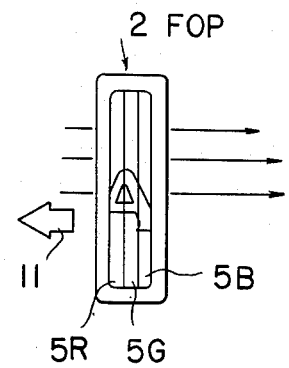
Figure 6:
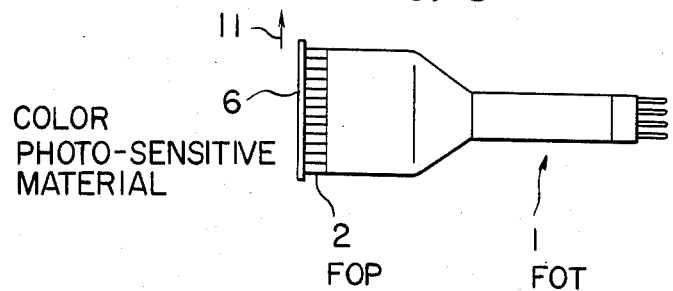
Figure 7:
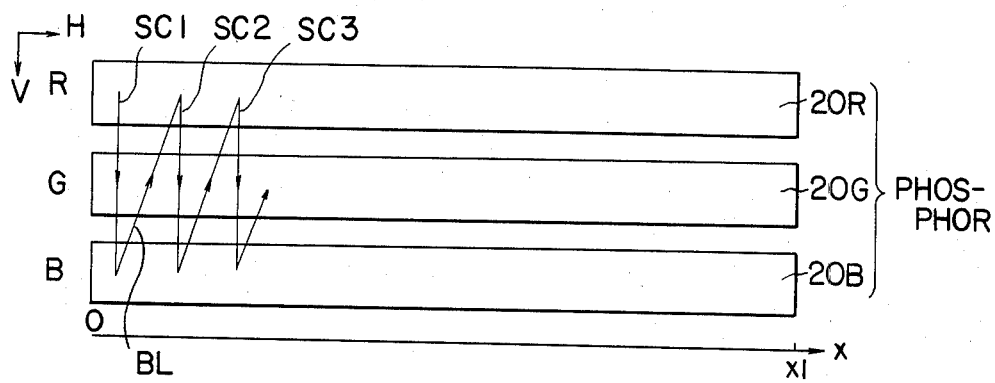
FIGS. 7 and 8 are views used for explaining scanning principle according to this invention.
Figure 8:
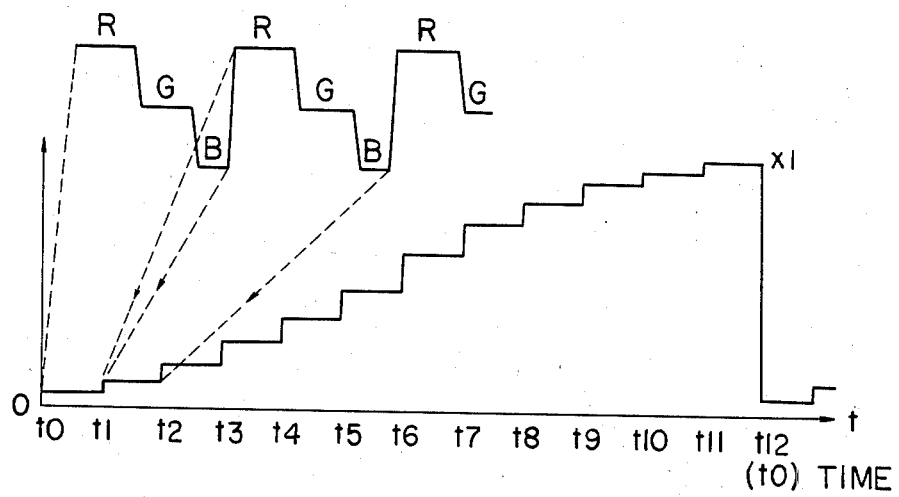

According to this invention, as shown in FIG. 7, the band-shaped phosphors 20R, 20G and 20B respectively representing red, green and blue colors are scanned in a vertical direction V as shown by a continuous scanning line SC1→SC2→SC3→ . . . and the scanning line is shifted in a horizontal direction H by a blanking operation BL thereby to entirely scan the picture surface. As shown in FIG. 8, each length x1 of the phosphor 20R, 20G or 20B is divided into 12 portions corresponding to a time interval t0–t12 and deviated in the horizontal direction H, and this horizontal deviation has a non-continuous step-like form. That is, as shown in FIG. 8, the color picture scanning is carried out with the scanning line SC1 during the time interval t0–t1 and with the scanning line SC2 during the time interval t1–t2 after the horizontal deviation, and subsequently the scanning lines SC3, SC4 . . . are subjected to the vertical deviation at horizontal components of horizontal deviation signals, i.e. at a time when not horizontally deviated during time intervals t2–t3, t3–t4, . . . Although the step of the horizontal deviation signal is raised during the blanking time BL shown in FIG. 7 and is deviated to the horizontal direction H, the deflection speed of the electron beam 4 at both ends of each phosphor 20R, 20G or 20B is decreased according to this invention. This is for the reason, as is apparent from the structure shown in FIG. 1, that the FOP 2 of the FOT 1 is made of a band-like flat plate, and that in the case where the electron beam 4 is deviated at an equal speed in a horizontal direction, the electron beam 4 runs at a relatively fast speed at the both ends of the FOT 1 and relatively slow speed at the central portion thereof thereby not to display an accurate picture on the FOP 2. Therefore, according to this invention, by decreasing the deviation speed of the electron beam 4 at the both ends of the FOT 1 and by relatively increasing the deviation speed thereof at the central portion thereof, there is obtained a display picture deviated horizontally always at the same speed on the FOP 2.

Moreover, according to this invention, the vertical scanning time of the picture colors R, G and B, i.e. illuminating time, is varied based on each color, and in actual, respective illuminating times regarding the red and green color sensitive components having relatively less sensitivity are elongated and the illuminating time regarding the blue color sensitive component having relatively better sensitivity is shortened in contrast with the red and blue color sensitive components. As described above, since the scanning of the picture colors R, G and B in the vertical direction is carried out linearly and the illuminating time of the picture color is varied depending on the respective colors, an accurate picture can be displayed on the photo-sensitive material 6 when the output picture of the FOT 1 is recorded on the photo-sensitive material 6 which is closely attached to the front surface of the FOT 1. In other words, since the scanning is carried out vertically with respect to one scanning line of the picture colors R, G and B, the picture element would be exposed with no horizontal shift to the photo-sensitive material 6 even if one picture element were color-separated and deviated to the picture colors R, G and B. In addition, since the illumination time can be varied in accordance with the phosphor 20R, 20G or 20B, respectively, the luminance amount can be adjusted in response to the sensitivity of the photo-sensitive materials 6. In this case, although it is possible to control the luminance signal levels with equal illuminating time of the respective phosphors, it is required to prepare a display scale having a range of from $10^3$ to $10^5$ in consideration of the difference of the sensitivity characteristics thereby to increase the constructional load. Taking this fact into consideration, in some cases, it is possible to control the luminance signal level as well as the illuminating time.

Figure 9:
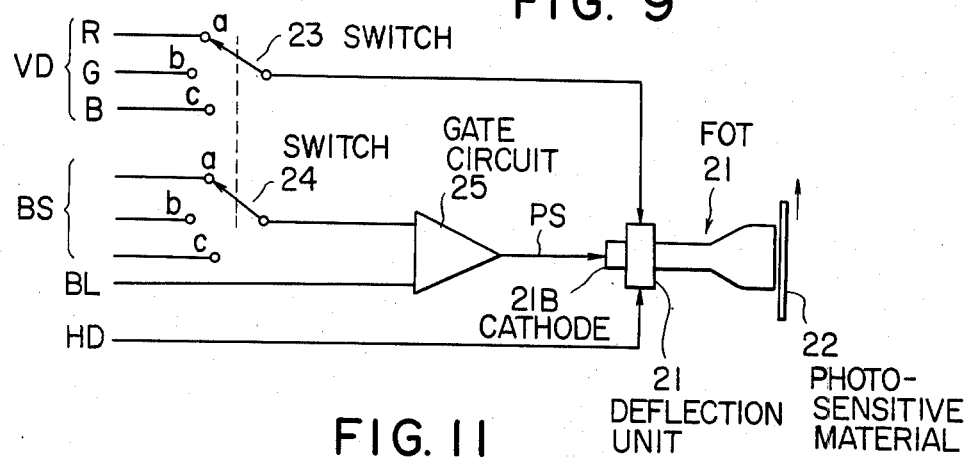

FIG. 9 shows a schematic diagram of a device for carrying out the scanning method according to this invention. As is understood from FIG. 9, a vertical deflection signal VD which determines the position of the phosphor 20R, 20G or 20B which is illuminated by the electron beam 4 is applied to a deflection unit 21A of the FOT 21 through a switch 23, and a horizontal deflection signal HD is also applied to the deflection unit 21A. The picture signals, i.e. luminance signals BS, regarding separated picture colors R, G and B are inputted into a gate circuit 25 through a switch 24 and a blank signal BL for instructing tehe blanking is also inputted into the gate circuit 25 thereby to input a luminance signal PS from the gate circuit 25 into a cathode 21B of the FOT 21. A photosensitive material 22 is closely disposed in front of the FOT 21 to be removable in an arrowed direction, for example. The switches 23 and 24 serve with operative connection together, and for instance, in the case where the vertical deflection signal VD is connected to contacts a of the switch 23 to scan the red phosphor 20R, the luminance signal BS is also connected to contacts a of the switch 24 to output the luminance signal of red color R, thereby to input the luminance signal PS regarding the red color into the cathode 21B through the gate circuit 25. The description regarding contacts a of the device shown in FIG. 9 also applies to the cases of contacts b and c of the switches 23 and 24.

According to the construction of the device shown in FIG. 9, for example, when the phosphor 20R is designated by the switch 23 with respect to the scanning line SC1 shown in FIG. 7, the signal regarding the red color of the luminance signal BS is inputted into the gate circuit 25 through the connection of the contacts a of the switch 24, and the luminance signal BS regarding the red color is inputted into the cathode 21B of the FOT 21 as a picture signal PS because the blank signal BL is not inputted at this time into the gate circuit 25. In this case, since the horizontal deflection signal HD has the horizontal characteristic feature shown in FIG. 8, the scanning line SC1 is not deflection in the horizontal direction H, so that the phosphor 20R can illuminate for the time when the contacts a of the switches 23 and 24 are made "on". Subsequently, when the switches 23 and 24 are changed to connect the contacts b, the deflection position based on the vertical deflection signal VD is inputted into the deflection unit 21A as the phosphor 20G regarding green color, and the luminance signal BS regarding the green color is also inputted into the cathode 21B as the picture signal PS, whereby the phosphor 20G of the FOT 21 can illuminate in response to the luminance signal BS representing the green color. In this case, the phosphor 20G can illuminate for the time when the contacts b of the switches 23 and 24 are made "on". Substantially the same operation will be carried out with respect to the phosphor 20B regarding blue color. Namely, upon completion of deviation of the blue color phosphor 20B, the blank signal BL is inputted into the gate circuit 25 by control means and the application of the picture signal PS to the cathode 21B is interrupted, so that the step voltage of FIG. 8 is inputted into the deflection unit 21A by the horizontal deflection signal HD thereby to horizontally deflect the scanning line so as to accord with the scanning line SC2 shown in FIG. 7. In accordance with the procedure substantially identical to that described above, the phosphors 20R, 20G and 20B are subsequently illuminated with respect to the scanning line SC2, and accordingly, the phosphors 20R, 20G and 20B are entirely scanned by repeating the scanning operations described hereinabove.

FIG. 10 is another detailed block diagram illustrating a device for carrying out the scanning method according to this invention. As is understood from FIG. 10, picture information regarding picture colors respectively separated into colors R, G and B is converted into digital amounts by an analog-to-digital (A/D) converter 31 through a multiplexer 30 and then stored in a buffer memory 32 in which, for example, frame information regarding one picture image or line information regarding one scanning line component is stored. A timing controller 33 generates a color control signal CD for outputting a picture signal regarding the picture colors R, G and B stored, a blank signal BLC for instructing the blanking, and a picture clock pulse PCK which is inputted into an address controller 34 from which a picture address is outputted to access the buffer memory 32, a look-up table 40 storing the vertical deflection signal and a look-up table 41 storing the horizontal deflection signal. The picture information of the picture colors R, G and B accessed from the buffer memory 32 is converted into an analog amount PID by a digital-to-analog (D/A) converter 42 through a multiplexer 35 and is then inputted into a gate circuit 46. The picture information of the picture colors R, G and B accessed from the look-up table 40 is converted into an analog amount VID by a digital-to-analog (D/A) converter 43 through a multiplexer 36 and is then applied through an amplifier 45 to the deflection unit 21A of the FOT 21 as a vertical deflection signal VD. Furthermore, the horizontal deflection signal HI accessed from the look-up table 41 is converted into an analog amount HID by a digital-to-analog (D/A) converter 44 and is then applied through an amplifier 47 to the deflection unit 21A of the FOT 21 as a horizontal deflection signal HD. Within the look-up table 40 is stored as a vertical deflection signal the position information shown in FIGS. 7 and 8 corresponding to the fluorescent material 20R, 20G and 20B, and within the look-up table 41 is stored a horizontal deflection signal represented by the step characteristics shown in FIG. 8 as a digital amount. An output from the gate circuit 46 is applied to the cathode 21B of the FOT 21 as a luminance signal PS.

According to the construction shown in FIG. 10, the picture information is separated into the informations respectively corresponding to the picture colors R, G and B and converted into digital amounts by the A/D converter 31 through the multiplexer 30 in accordance with a predetermined sequence, and thereafter, stored in the buffer memory 32. After completion of storing of the whole information in the buffer memory 32, the timing controller 33 outputs the color control signal CD controlled by the luminance time of the picture colors R, G and B as shown in FIG. 8, for example. Signals are read out with respect to the picture colors R, G and B from the buffer memory 32 and the look-up table 40 through the multiplexers 35 and 36, respectively, and are transferred to the D/A converters 42 and 43 to convert the signals into the analog amounts. The timing controller 33 generates the picture clock PCK corresponding to the color control signal CD and a picture address PA is then produced in the address controller 33 whereby the buffer memory 32 synchronizes with the look-up tables 40 and 41. Namely, when the picture information of the picture color R is accessed from the buffer memory 32, the look-up table 40 is obliged to output the position signal R corresponding to the information of the red color and the level signal in response to the order of the accessing process is outputted in accordance with the characteristic steps represented by FIG. 8. As described above, the picture information of the respective picture colors R, G and B accessed from the buffer memory 32 is converted into analog amounts PID by the D/A converter 42 through the multiplexer 35 and then inputted into the gate circuit 46, and when the blank signal BLC is not generated from the timing controller 33, the picture information is applied to the cathode 21B of the FOT 21 as the picture signal PS thereby to perform the picture scanning as shown in FIG. 7. Namely, the position signals corresponding to the positions of the phosphors 20R, 20G and 20B of the picture colors R, G and B are accessed from the look-up table 40, then converted into analog amounts VID by the D/A converter 43 through the multiplexer 36 and applied to the deflection unit 21A through the amplifier 45. In the like manner, the horizontal deflection signal HI is converted into an analog amount HID by the D/A converter 44 and then applied to the deflection unit 21A through the amplifier 47 thereby to carry out the picture scanning as shown in FIG. 7.

Figure 11:
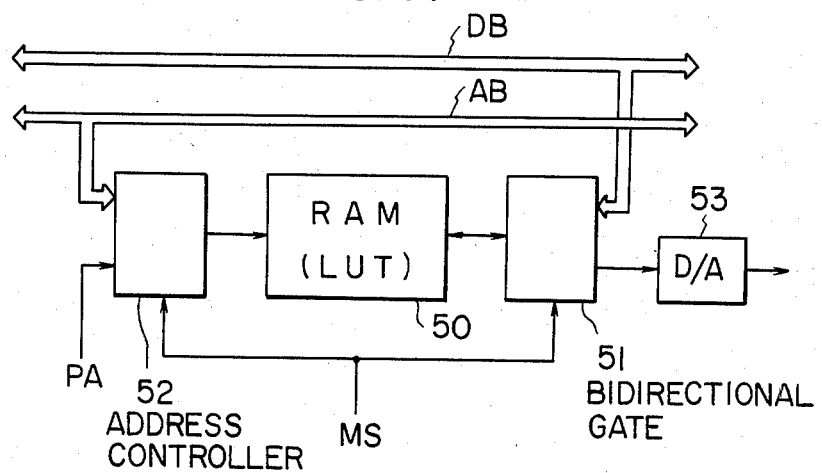
FIGS. 11 and 12 are schematic diagrams showing examples of look-up tables used in the apparatus shown in FIGS. 9 and 10.

FIG. 11 shows an example in which the look-up table 40 or 41 is constituted by a random access memory (RAM) 50 into which necessary information can be written through a data bus DB from a central processing unit (CPU) and through a bidirectional gate 51, and in the write-in address of the RAM 50, the information from the CPU is written in the predetermined address through an address bus AB and/or an address controller 52 by a picture address PA. A write-in mode in switched by a mode switching signal MS. The read-out of the data from the RAM 50 is performed by the address bus AB from the CPU or the picture address PA from a scanning device, and the accessed information is converted by a digital-to-analog (D/A) converter 53 through the bi-directional gate 51 into the analog amount which is then outputted.

Figure 12:
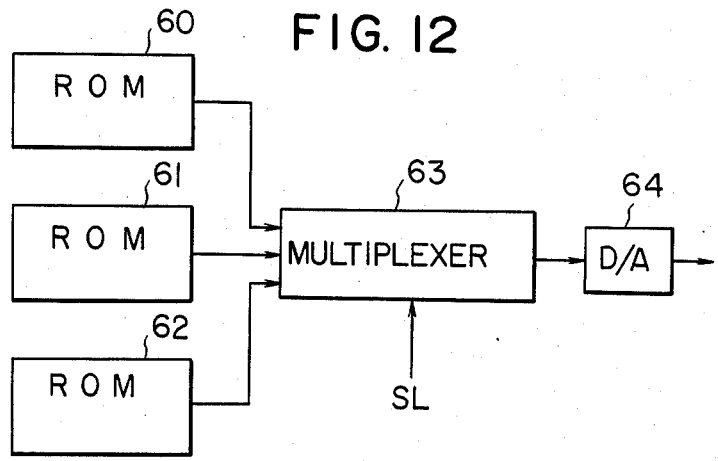

FIG. 12 also shows another example in which the look-up table 40 or 41 is constituted by a read only memory (ROM) in which the picture information is preliminarily written in three ROM 60, 61 and 62. The data stored in the respective ROMs are read out by a multiplexer 63 and the read-out data are converted into analog amounts by a digital-to-analog (D/A) converter 64 and then outputted. As described above, the provision of the look-up tables consisting of the RAM or ROM makes it possible to store the vertical and horizontal deflection signals with their analog amounts, and moreover, when the look-up table is constituted by the RAM, the picture information can optionally be rewritten and when constituted by the ROM, the information can be written in a plurality of ROMs to optionally select the look-up table.

As stated above, the scanning method according to this invention controls the luminance time for each color phosphor corresponding to the characteristics of the phosphor and the sensitivity of the photosensitive material, and thus can obtain the recorded images of high quality. Since the scanning method according to this invention carries out the vertical deviation at a time when not horizontally deviated as well as the horizontal deviation of the electron beam in the FOT by step operatoins, it is possible to entirely record the picture data separated into colors R, G and B. Further, according to this invention, since the deviation of the electron beam is performed at a fast speed at the both ends of the FOT and at a slow speed at the central portion thereof, it is possible to obtain the high qualitative images in whole screen of the FOT.

It should be understood that many modifications and adaptations of the invention will become apparent to those skilled in the art and it is intended to encompass such obvious modifications and changes in the scope of the claims appended hereto.

What is claimed is:

1. A method for scanning a color fiber optic tube of a single electron gun type in which a screen is formed by a plurality of band-shaped phosphors providing different illuminant colors, respectively, comprising the steps of:

vertically deflecting an electron beam from said electron gun in a lateral direction with respect to the plurality of the phosphors; and horizontally deflecting the electron beam in a longitudinal direction with respect to the phosphors, wherein the horizontal deflection of the electron beam from the electron gun is performed in a stepped manner in which the horizontal deflection is stopped during a time interval when one raster of the vertical deflection of the electron beam sweeps across the plurality of phosphors and the horizontal deflection progresses stepwisely when the vertical deflection is subsequently moved to a next raster.

2. A method for scanning according to claim 1, wherein the vertical deflection of the electron beam from the electron gun is time controlled in response to the sensitivity of a photo-sensitive material disposed adjacent to the fiber optic tube for recording a picture and the sensitivity of the phosphors.

3. A method for scanning according to claim 2, wherein the time control of the vertical deflection includes a luminance control in response to the sensitivity of the photo-sensitive material and the sensitivity of the phosphors.

4. A method for scanning according to claim 1, wherein the stepwise progression of the horizontal deflection is smaller at end portions than at middle portions of each phosphor.

5. A method for scanning according to claim 1, wherein the horizontal deflection is performed in accordance with digital information stored in a look-up table.

* * * * *